Nov. 13, 1928.    G. M. BELLANCA    1,691,105

LANDING GEAR FOR AIRPLANES

Filed Sept. 16, 1926

INVENTOR.
Giuseppe Maria Bellanca
BY
Stockbridge & Borst
ATTORNEYS

Patented Nov. 13, 1928.

1,691,105

UNITED STATES PATENT OFFICE.

GIUSEPPE MARIO BELLANCA, OF PASSAIC, NEW JERSEY.

LANDING GEAR FOR AIRPLANES.

Application filed September 16, 1926. Serial No. 135,771.

REISSUED

This invention relates generally to landing gear constructions for airplanes.

Landing gear structures such as have been heretofore provided for airplanes have been open to the objection that guides or sliding members have been used to permit of the necessary up and down bodily movement of the ground engaging wheels with relation to the fuselage that takes place in the landing contact and the subsequent bounding movement of the airplane. Such guides or sliding parts are a considerable source of weakness and trouble in operation.

Difficulty has also been found in accommodating the landing gear structure to the contour of fuselage frameworks of different sizes and inclinations and at the same time provide for a vertical disposition of the landing wheels with a sufficient lateral spacing therebetween to provide a desired stability. In addition the prior constructions have included exposed parts which have been the cause of air resistance.

The objects of the present invention are to provide a landing gear construction which will be free from the objections referred to and which will be characterized by strength and simplicity of structure, simple accommodation to different types of airplanes, and by a minimum exposure of air resisting surfaces.

The invention includes a landing wheel supporting frame having an articulated or hinged mounting at one end and with a flexible mounting at the other end. The laterally extending axis of the hinge connection, which in the accompanying drawings is shown at the forward end of the wheel supporting framework, has a length sufficient to insure the maintenance of the landing wheel in a true fore and aft direction coincident with the direction of travel of the airplane. The rear extremity of the wheel supporting frame is connected to a stationary part through a suitable shock absorbing mechanism known in this art.

Another feature of the invention resides in the use of strong and rigid structural members in the form of girders having an angle or bend therein differing in different devices to accommodate the fuselages of different airplanes. The upper terminal portions of the girder pieces are formed for simple pin joint attachment to the fuselage framework so that the landing gear can be readily removed or attached to the fuselage as circumstances may require.

Still another feature of the invention resides in a streamline fairing or enclosing shell for the landing gear parts which obviates exposure of parts to cause air resistance in operation.

Other features of the invention will be hereinafter referred to.

In the drawings, in which a preferred embodiment of the invention has been selected for illustration, Figure 1 is a view in perspective of an airplane equipped with landing gear embodying the invention.

Figure 1:
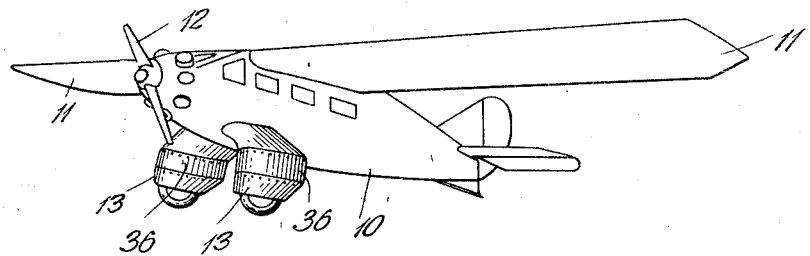
Figure 3:
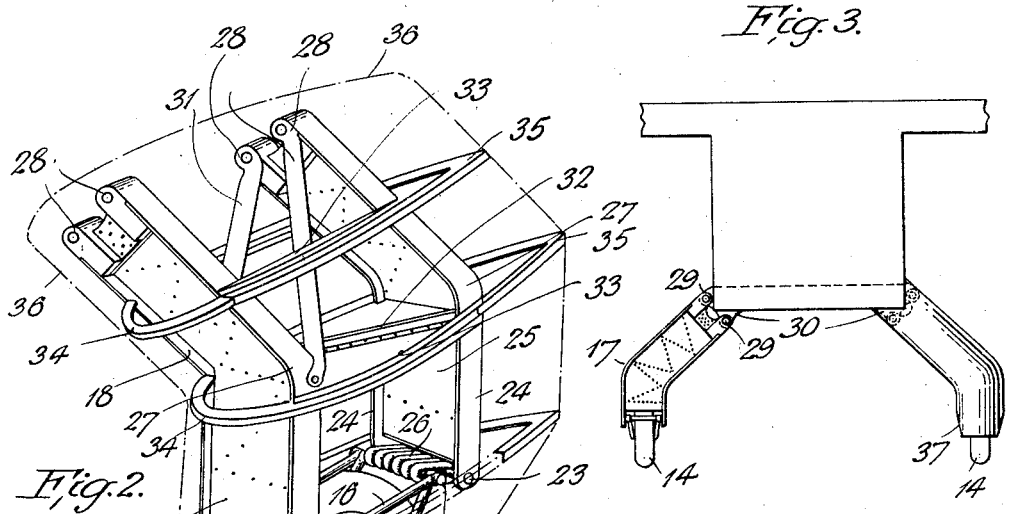
Figure 3 is a view in front elevation showing a portion of an airplane fuselage and the relation of the landing gear thereto, one of the landing gears having parts broken away to show the internal arrangement of structure.

Referring to the drawings for a more detailed description of the invention, in Figure 1 is shown an airplane having a fuselage 10, planes 11. tractor propeller 12, and a pair of landing gear structures 13. the landing gear forming the subject matter of the invention hereinafter set forth.

Figure 2:
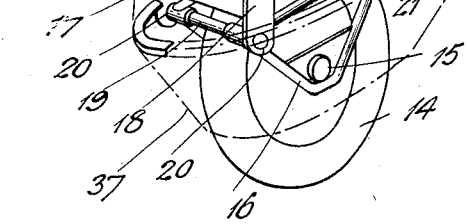
Figure 2 is a perspective view on an enlarged scale, with parts broken away, showing in detail the construction of the landing gear shown in Figure 1.
Figure 5:
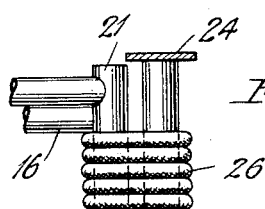
Figure 5 is a view in horizontal section taken on the line 5—5 of Figure 4.
Figure 4:
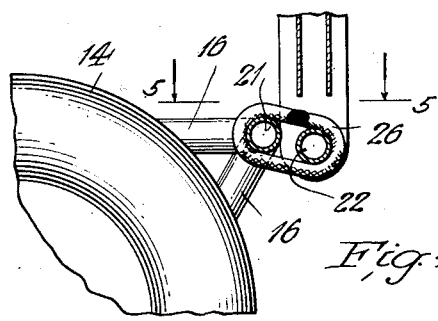
Figure 4 is a view in vertical section and on an enlarged scale of a detail of construction taken on the line 4—4 of Figure 5.

Referring to Figure 2 of the drawings, a ground-engaging wheel 14 is mounted on an axle 15 carried in a rigid skeleton framework 16. The framework 16 has an articulated or hinged connection at its forward end with the lower extremities of a girder member 17 of an I-beam type and having edge flange members 18. The hinge structure referred to consists of a pintle pin or rod 19 forming part of the skeleton framework 16 and having a pivoted bearing 20 at its end portions in the lower extremities of the girder edge flanges 18. It will be seen that the laterally extending pintle rods 19 have a substantial length so that the ground wheel 14 is maintained rigidly in fore and aft alinement with the direction of travel of the airplane.

In order to permit oscillating movement of the ground wheel structure about the forward hinge member, a flexible connection is provided between the rearward transverse frame piece 21 of the framework 16 and an adjacent fixed transverse frame piece 22 supported at 23 in the lower terminal portions of the flanges 24 of a rearwardly located girder member 25. The flexible connection referred to consists of a rubber cord 26 wound about the transverse frame pieces 21 and 22 in enclosing relation thereto to provide an elastic or resilient shock-absorbing connection between the wheel supporting framework 16 and the rigid portion of the structure.

It will be seen that the girders 17 and 25 have a bend or turn 27 therein, the angle of which is determined by the size and inclination of the fuselage surface of the airplane to which the landing gear is to be attached, and by the angle which it is desired that the landing gear shall have to the surface of the fuselage. It will be seen that the lower ends of the landing gear sets have a vertical disposition with a stabilizing widely spaced apart location of the landing wheels 14.

In order to provide a readily disengageable attachment of the landing gear to the fuselage framework the upper terminals of the girder members 17 and 25 are provided with lug extensions 28 having perforations therein to receive pins 29 adapted to removably attach the girders to corresponding lugs 30 formed on the fuselage framework.

In order to rigidly brace the landing gear framework suitable diagonal strut members 31 and 32 are provided between the main girder members 17 and 25, and also horizontal brace members 33. The latter with forward bowed members 34 and rearward peaked members 35 form supporting members for a sheet metal sheathing or fairing 36 which is thus given a formation to provide a streamline effect that will provide a minimum air resistance in operation. The lower portion of the fairing 36 has a skirt formation 37 with inwardly and downwardly converging forward and lateral walls to prevent pocketing and interference with the flow of air in flight.

I claim:

1. In a landing gear for airplanes, a pair of girder members adapted to be removably attached at their upper ends to the fuselage of an airplane, said girder members being spaced apart longitudinally of the fuselage, strut members rigidly connecting said girder members, and a landing wheel supported between the lower ends of said girder members.

2. In a landing gear for airplanes, a pair of girder members adapted to be removably attached at their upper ends to the fuselage of an airplane, said girder members being spaced apart longitudinally of the fuselage, said girder members having a bend therein whereby the upper portions extend diagonally outwardly and downwardly from the fuselage and the lower portions have a substantially vertical disposition, and a landing wheel supported by and between the lower ends of said girder members.

3. In a landing gear for airplanes, a pair of girder members adapted to be attached at their upper ends to the fuselage of an airplane, and a wheel supporting framework having an articulated connection at its forward end with the lower end of one of said girder members and a flexible connection between the rearward end of the framework and the lower end of the other girder member.

4. In a landing gear for airplanes, a pair of girder members adapted to be removably attached at their upper ends to the fuselage of an airplane, said girder members being spaced apart longitudinally of the fuselage, said girder members having a bend therein whereby the upper portions extend diagonally outwardly and downwardly from the fuselage and the lower portions have a substantially vertical disposition, a wheel supporting framework having its forward end hinged to the lower end of the forward girder member, and a resilient connection between the lower end of the rearward girder member and the rearward end of the wheel supporting member.

5. In a landing gear for airplanes, a pair of girder members adapted to be removably attached at their upper ends to the fuselage of an airplane, said girder members being spaced apart longitudinally of the fuselage, a landing wheel supported between the lower ends of said girder-members, and a fairing having a streamline formation and enclosing the entire landing gear structure except the lowermost portion of the landing wheel.

6. In a landing gear for airplanes, a pair of girder members adapted to be removably attached at their upper ends to the fuselage of an airplane, said girder members being spaced apart longitudinally of the fuselage, said girder members having a bend therein whereby the upper portions extend diagonally outwardly and downwardly from the fuselage and the lower portions have a substantially vertical disposition, a wheel supporting framework having its forward end hinged to the lower end of the forward girder member, an elastic tension member resiliently anchoring the rearward end of the framework to the lower end of the other girder member, and a fairing having a streamline formation and enclosing the entire landing gear structure except the lowermost portion of the landing wheel.

7. In a landing gear for airplanes, a pair of girder members adapted to be attached at their upper ends to the fuselage of an airplane, said girder members being spaced apart longitudinally of the fuselage, and a landing wheel supported between the lower ends of said girder members.

In witness whereof, I hereunto subscribe my signature.

GIUSEPPE MARIO BELLANCA.